Figure 1:
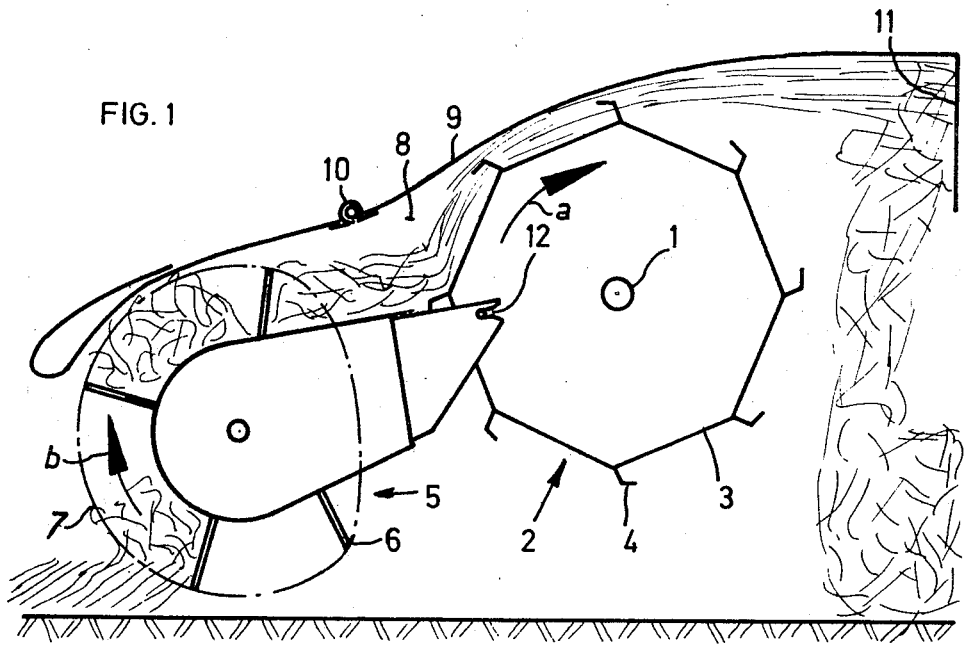

United States Patent

Hauser-Lienhard

[15] 3,676,988

[45] July 18, 1972

[54] HAY-MAKING MACHINE

[72] Inventor: Hans Ulrich Hauser-Lienhard, Zurich, Switzerland

[73] Assignee: Bucher-Guyer AG Maschinenfabrik, Niederweningen, Zurich, Switzerland

[22] Filed: Jan. 30, 1970

[21] Appl. No.: 7,086

[30] Foreign Application Priority Data

Jan. 31, 1969 Switzerland ..........................1535/69

[52] U.S. Cl. .......................................56/1, 56/157, 56/192, 56/364, 56/371, 56/372

[51] Int. Cl. .....................................................A01d 43/00

[58] Field of Search ................56/1 C, 13.3, 13.4, 153–158, 56/364, 192, 365–374, 503, 193, 502, 500

[56] References Cited

UNITED STATES PATENTS

| 3,437,152 | 5/1969 | Barrentine | 56/500 X |
|---|---|---|---|
| 2,727,347 | 12/1955 | Fenster et al. | 56/365 X |
| 2,925,703 | 2/1960 | Atmore | 56/502 |
| 2,918,774 | 12/1959 | McCarty | 56/1 C |
| 3,474,610 | 10/1969 | Kreienbaum et al. | 56/372 |
| 2,815,636 | 12/1957 | Reilly, Sr. | 56/370 |
| 3,178,876 | 5/1965 | Lundberg | 56/372 |
| 3,115,737 | 12/1963 | Harrer et al. | 56/1 C |
| 2,641,097 | 6/1953 | Mast | 56/1 C |
| 3,284,875 | 11/1966 | Wood | 56/1 C X |
| 3,513,645 | 5/1970 | Garrett et al. | 56/1 C |

FOREIGN PATENTS OR APPLICATIONS

| 263,432 | 7/1968 | East Germany | 56/503 |
|---|---|---|---|
| 1,412,194 | 8/1965 | France | 56/1 C |
| 741,828 | 12/1955 | Great Britain | 56/1 C |
| 377,138 | 6/1964 | Switzerland | 56/1 C |
| 381,006 | 10/1964 | Switzerland | 56/1 C |

OTHER PUBLICATIONS

Brillion, Tripee Action Conditioner, Feb. 5, 1959 Pamphlet

Primary Examiner—Antonio F. Guida
Assistant Examiner—J. A. Oliff
Attorney—Karl W. Flocks

[57] ABSTRACT

A hay-making machine comprises a rotary beating drum or drums provided with beater bars for subjecting the cut grass and stalk material to a beating, crushing and buckling action in order to accelerate the consecutive drying process. Rotary pick-up means are arranged ahead of the beating drum to deliver the cut stalk material into the range of the beating drum. A guide plate cooperates with the beating drum to define a conveying conduit for the stalk material. The end of the guide plate is provided with a baffle forming an impact surface against which the stalk material is thrown by the beater drum before it falls again on the ground. A further impact surface may be formed by said guide plate intermediate the length of the conveyer conduit. The pick-up means may be a rotary member provided with prongs for picking up the cut stalk material from the ground, or it may be combined with a disc-type or gyratory mower arranged ahead of the beating drum for cutting and at the same time picking up the stalk material.

6 Claims, 10 Drawing Figures

HAY-MAKING MACHINE

The invention relates to hay-making machines of the kind having at least one rotating beating drum destined to impart injuries to the harvesting goods, and a guide plate defining a conveying conduit together with the beating drum.

For obtaining a uniform and accelerated drying process of the harvesting goods laying on the ground, hay-making machines are used which have working tools for mechanically damaging the stems of the stalk material or grass, for example by buckling, crushing or beating of the stalks, to accelerate evaporation of water contained in the stalks.

Known stalk crushing machines comprise working tools consisting of two meshing gear rollers between which the stalk material is passed and crushed or buckled at spaced intervals, whereby the water can escape from the stalks at the places where they are fractured.

In further known stalk crushing machines, the stalk material is passed between two smooth surface rollers and crushed. The stalks thus are broken up over their length.

The efficiency of breaking and crushing of the stalk material in such machines is unsatisfactory, particularly when with a relatively great amount of grass the stalk material must pass the crushing and breaking rollers in a layer of considerable thickness, so that the stalks situated in the innermost portion of the layer are damaged only incompletely or not at all. The degree of dryness of stalk material having been treated by such machines accordingly is irregular and unsatisfactory.

A further kind of injury of stalk goods is obtained with the so-called mallet drum machines in which mallets hingedly connected to a rotating drum and maintained in radial position by centrifugal action exert a beating action on the stalk material received in upright position or laid in swaths. In such machines good drying results are obtained but the machines have the inconvenience that due to the vigorous beating action of the mallets an excessive loss of leave and stalk material is obtained and that a considerable fouling of the harvesting goods cannot be avoided owing to the direct admission of stalk material by the drum.

It is an object of the invention to provide a hay-making machine which avoids the above noted inconveniences.

The hay-making machine according to the invention comprises a rotary beating drum, a pick-up means arranged ahead of the beating drum for lifting off stalk material from the ground, a guide plate cooperating with said beating drum to define a conveying conduit for the picked-up stalk material and to convey the material into the operating range of the beating drum, said beating drum being provided with beater bars formed on its surface and substantially directed transversely to the flow of stalk material in said conveying conduit.

An increased conditioning action of the beating drum can be obtained when a further means exerting a beating action on the stalk material is provided on the conveying path of the material. Such a means can be formed for example by an impact surface which brakes the flow of the conveyed material and which, preferably, is formed by a portion of said guide plate.

A further means for such increased beating action is the arrangement of a second beating drum situated rearwardly of said first named beating drum. A particularly thorough conditioning action is obtained when this second beating drum is situated above the first named drum and turns in opposite direction with respect to the first drum and the two drums act from opposite sides, i.e. from above and from below, on the stalk material flowing through the conveying conduit.

In order to obtain mowing and conditioning of the stalk material in a single operation, a mower is arranged ahead of the beating drum. Advantageously a disc-type mower may be used and the beating drum is arranged immediately above the mower and has its horizontal axis situated behind the centers of the vertical axes of mower discs.

Further objects and advantages of the invention will become apparent from the following specification, reference being had to the accompanying drawings representing several embodiments of a hay-making machine according to the invention.

Figure 2:
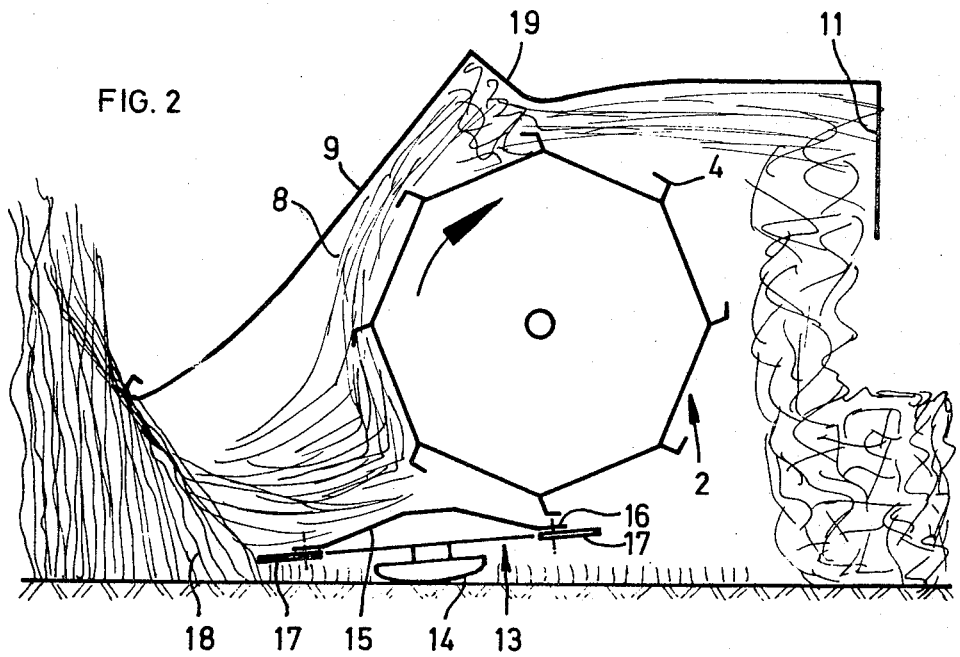
Figure 3:
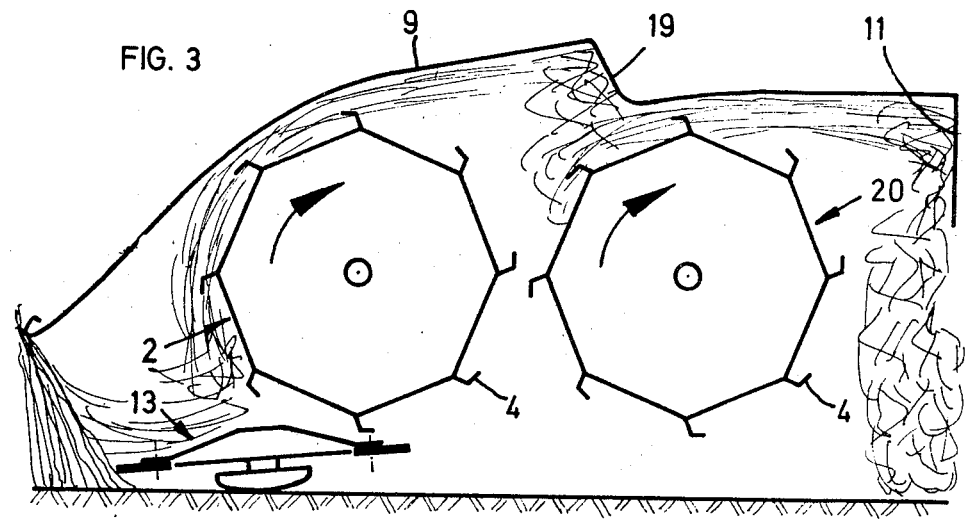
Figure 4:
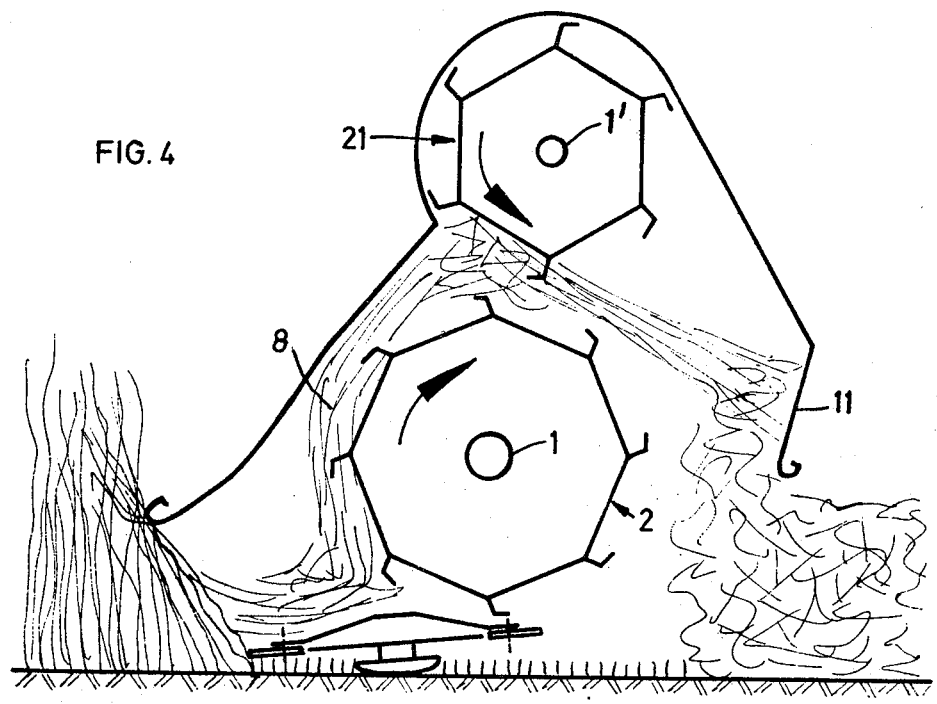
Figure 5:
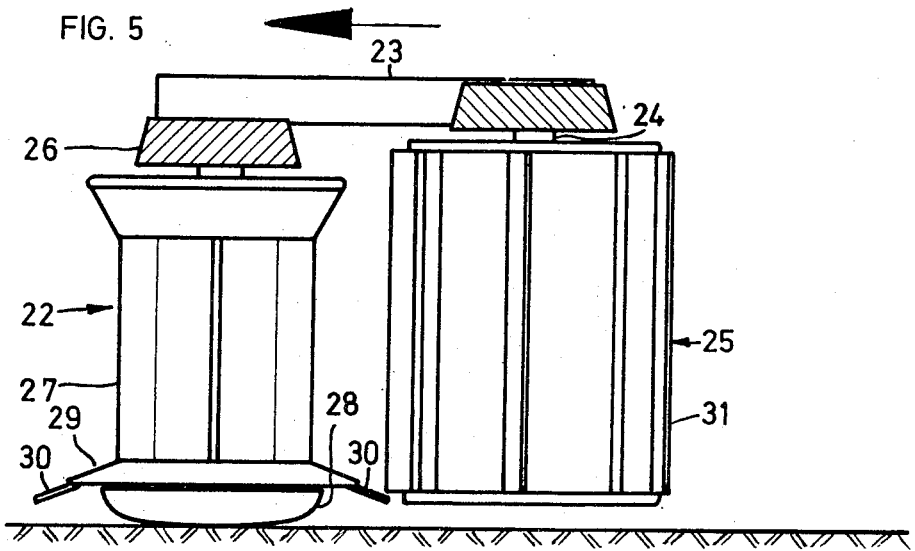
Figure 6:
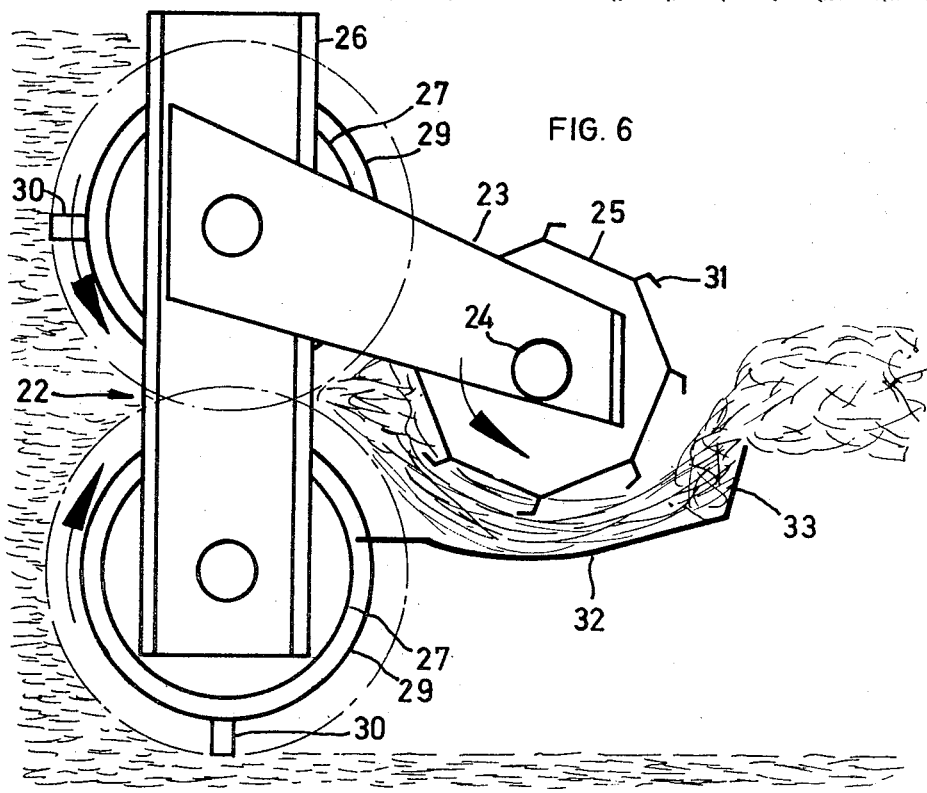
Figure 7:
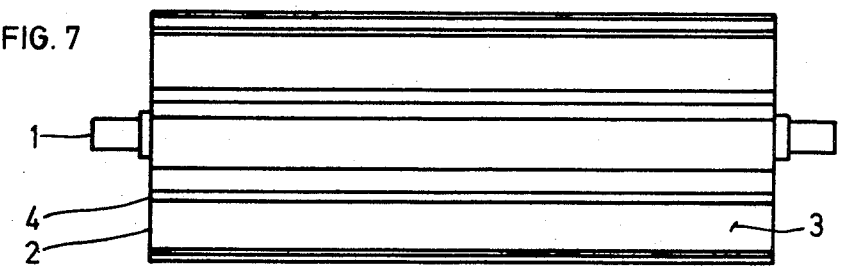
Figure 8:
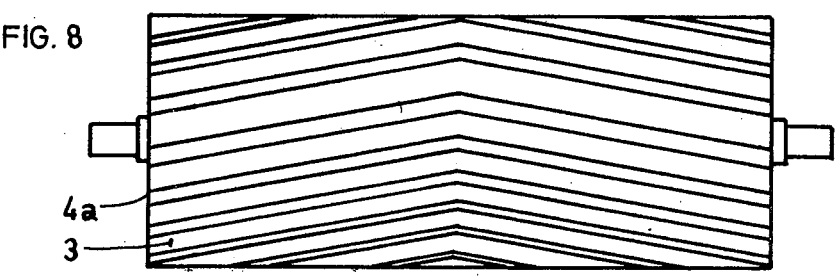
Figure 9:
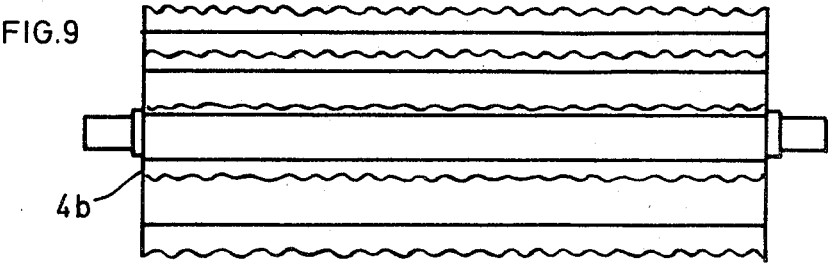
Figure 10:
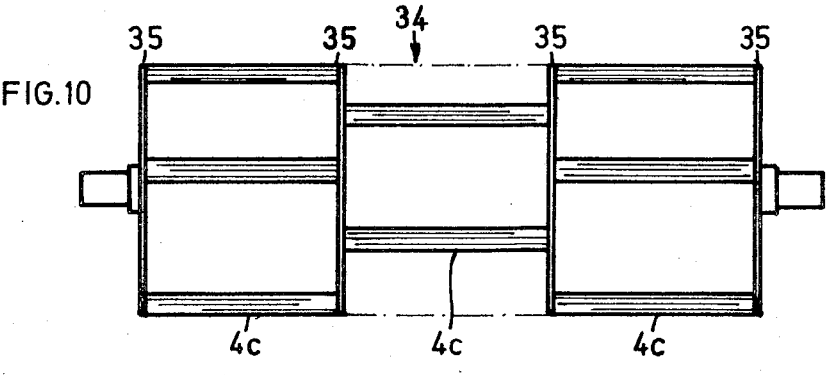

FIG. 1 is a diagrammatic side elevation of a hay-making machine having a beating drum and a pick-up roller arranged ahead of the drum, FIG. 2 is a side elevation of a hay-making machine having a beating drum and a disc mower arranged ahead of the drum, FIG. 3 is a side elevation of a hay-making machine having two beating drums disposed one behind the other in the direction of movement of the machine, FIG. 4 is a side elevation of a hay-making machine having two beating drums disposed one above the other, FIG. 5 is a side elevation of a hay-making machine having a beating drum rotating about a vertical axis, and a drum type mower arranged ahead of the beating drum, FIG. 6 is a plan view of the hay-making machine according to FIG. 5, FIG. 7 is a front view of a beating drum, FIGS. 8, 9 and 10 are front views of three types of beating drums.

In FIG. 1 a beating drum 2 is rotatably mounted on a horizontal axis 1 and is driven to rotate in the direction of the arrow $a$. The drum 2 has a polygonal drum barrel 3 the edges thereof being provided with beater bars 4 extending axially over the whole length of the drum. Arranged ahead of the beating drum is a pick-up rotor 5 having positively controlled rake prongs 6 the ends of which rotate in the direction of the arrow $b$ along an orbit 7 indicated in dash-and-dot lines. A guide plate 9 covers the pick-up rotor 5 and the beating drum 2 and defines the upper limit of a conveying conduit 8. This plate 9 is provided with a hinge 10 and its rear end forms a downwardly extending baffle 11.

The beating drum 2 and the pick-up rotor 5 are supported each by two ground wheels not shown. The pick-up rotor 5 is supported on a bearing pin 12 for effecting a free pivotal movement in a vertical plane in order to follow the unevenness of the ground.

The rotor 5 picks up the cut harvesting goods lying on the ground and delivers it to the conveying conduit 8 into reach of the beating drum 2. Due to the fact that the region of delivery of the pick-up rotor 5 is situated substantially on the same level as the horizontal axis 1 of the beating drum 2, the conveying flow of material in this region is directed substantially radially with respect to the beating drum 2. This fact, and in addition the comparatively high speed of revolution of the beating drum 2 have the effect that the beater bars 4, besides conveying the material, exert a beating impacting action on the stalk material delivered by the pick-up rotor 5, whereby the stalks in part are buckled or broken and in part are longitudinally slit. The stalk material thus accelerated by the beating drum 2 flows away from the beating drum in tangential direction in the conduit 8 along the guide plate 9 and arrives at the baffle 11 where it is suddenly braked. The impact of the stalk material against the baffle causes further injury to be imparted to the material.

After impact against the baffle 11, the material falls downwardly on the ground where it is exposed to the natural drying process the duration of which is substantially reduced owing to the above described conditioning of the stalk material.

The hay-making machine according to FIG. 2 comprises a disc type mower 13 arranged ahead of the beating drum 2. The mower is mounted on a cross beam 14 sliding on the ground and comprising a plurality of umbrella-shaped, rotatably driven discs 15 disposed side by side transversely to the advancing movement of the machine. Knives 17 are hingedly connected to the edge 16 of the discs 15. The knives of one pair of adjacent discs 15 rotating in opposite directions first cut the upright grass 18 which is then lifted off the ground by the discs 15 and brought into the conveying range of the beating drum 2. When the stalk material moves upon the discs 15 and is picked-up by the drum 2, the beater bars 4 of the drum exert a first beating impacting action on the stalks. A second place where a beating impacting action is exerted on the material is situated in the conveyer conduit 8 in front of an impact surface 19 formed by a bend of the guide plate 9. A third impact surface is formed again by the baffle 11.

As shown in FIG. 3, a hay-making machine according to FIG. 2 can be provided with a further similar beating drum 20, both beating drums 2 and 20 being mounted one behind the other on the same level and rotate in the same direction as indicated by the arrows.

In the same manner as in the example according to FIG. 2, a beating impacting action is exerted at the place of delivery of the stalk material from the disc-type mower 13 to the front beating drum 2, and at the impact surface 19 of the guide plate 9. A further beating action in this example is provided in that the conveyed material when falling down from the impact surface 19 and conveyed further on by the second beating drum 20, the beater bars 4 of this drum exert an additional beating action on the stalk material and then throw the material against the baffle 11 where the material is subjected to a last beating action.

In a further modification of a hay-making machine according to FIG. 4 a second beating drum 21 is arranged above the first drum 2, the two drums rotating in opposite directions. The upper drum 21 has a slightly smaller diameter than the drum 2 and rotates about an axis 1' situated behind the axis 1 of the lower drum 2 with respect to the advancing direction of the machine. The stalk material after having been picked up by the lower beating drum flows first through the conveyer conduit 8 and then passes between the two beating drums 2 and 21 and is thrown against the baffle 11. Due to cooperation of the two drums in their common conveying range therebetween this arrangement results in a particularly thorough beating action.

FIGS. 5 and 6 show a further example of a hay-making machine which comprises the combination of a gyratory mower 22 known per se with a beating drum 25 rotating about a vertical axis 24 mounted on a supporting beam 23. The mower 22 consists of two cylindrical gyrators 27 rotating in opposite directions about vertical axes carried by a beam 26 sliding along the ground on skids 29. Two knives 30 are hinged to the lower end flange 29 of each gyrator 27. The about beating drum 25 provided with beater bars 31 is situated behind the gyratory mower 22 between the two gyrators and is associated with a guide plate 32 terminating by a baffle 33.

The stalk material cut by the knives 30 of the mower 22 and conveyed rearwardly between the two gyrators 27 receives a first blow by the beater bars 31 of the drum 25 and a second blow upon impacting against the baffle 33.

FIG. 7 shows the arrangement of the beater bars 4 extending along a continuous straight line along the closed barrel wall 3 of the drum 2 (or 20 and 21) in axial direction.

In FIG. 8 the beater bars 4a have the shape of a herring bone gear.

The beating drum shown in FIG. 9 is provided with beater bars 4b formed like saw teeth for increasing the crushing action or injury imparted to the stalk material.

FIG. 10 shows a further arrangement of a beating drum 34 which is provided with four discs 35 connected to each other by beater bars 4c forming a cage-like structure.

I claim:

1. A hay curing machine for cutting grass and stalk material and conditioning the material by beating it by impacting comprising
    a rotating mower rotating about a substantially vertically extending axis for cutting the grass and stalk material,
    a beating drum means for impacting the grass and stalk material positioned above and behind said mower and including at least one rotating beating drum arranged to rotate about a substantially horizontally extending axis,
    said beating drum means having beater bars for impacting and conveying the grass and stalk material,
    said mower and said beating drum means positioned relative to each other to direct the flow of grass and stalk material cut by said mower from said mower substantially radially toward said axis of said beating drum means,
    a wall member positioned above said beating drum means and spaced therefrom for forming a conveying conduit with said beating drum means,
    and first impacting surface means for receiving the grass and stalk material passing through said conveying conduit against said surface means for directing it toward said beating drum means.

2. The hay curing machine of claim 1, further characterized by
    a second impacting surface means to receive the grass and stalk material thereagainst from said beating drum means after its return toward said beating drum means from said first impacting surface means.

3. The hay curing machine of claim 1, further characterized by
    said first impacting surface means formed as a portion of said wall member.

4. The hay curing machine of claim 3, further characterized by
    said beating drum means including a second rotating beating drum rotating in the same direction as the first mentioned of said beating drums and arranged behind it in the direction of flow of the grass and stalk material and positioned to receive the grass and stalk material from said first impacting surface means.

5. The hay curing machine of claim 1, further characterized by
    said first impacting surface means including a second beating drum arranged above said first mentioned beating drum and rotating in an opposite direction therefrom.

6. The hay curing machine of claim 5, further characterized by
    said second beating drum arranged to rotate about a substantially horizontally extending axis situated rearwardly of said axis of said first mentioned beating drum with respect to the direction of advance movement of the machine.

* * * * *